United States Patent [19]

Ellsworth et al.

[11] Patent Number: 4,969,285

[45] Date of Patent: Nov. 13, 1990

[54] FISHING POLE HOLDER AND FISH-ON INDICATOR

[76] Inventors: Thayne N. Ellsworth, 3910 Hill Rd.; Allen I. Martinson, 6838 Lamplighter; Samuel T. Wicks, 6276 Glencrest, all of Boise, Id. 83703; Mavis E. Buck; Victor W. Johnson, both of 334 Bitteroot Dr., Boise, Id. 83709

[21] Appl. No.: 423,370

[22] Filed: Oct. 19, 1989

[51] Int. Cl.⁵ ............................................. A01K 97/12
[52] U.S. Cl. ....................................... 43/17; 43/21.2
[58] Field of Search ........................ 43/16, 17, 21.2; 248/531

[56] References Cited

U.S. PATENT DOCUMENTS

| | | | |
|---|---|---|---|
| 3,012,354 | 12/1961 | Hansen | 43/17 |
| 3,359,672 | 12/1967 | Schwartz | 43/17 |
| 3,628,275 | 12/1971 | Howard | 43/17 |
| 3,646,697 | 3/1972 | Jennings | 43/17 |
| 3,903,633 | 9/1975 | Hutcherson | 43/17 |
| 3,945,143 | 3/1976 | Schmitt, Sr. | 43/17 |
| 4,142,316 | 3/1979 | Greer et al. | 43/17 |
| 4,154,015 | 5/1979 | Holland | 43/17 |
| 4,202,125 | 5/1980 | Kovacs | 43/17 |
| 4,217,720 | 8/1980 | Karr | 43/17 |
| 4,399,630 | 8/1983 | Lawes | 43/17 |
| 4,455,779 | 6/1984 | Cosic | 43/17 |
| 4,506,468 | 3/1985 | Willhite | 43/17 |
| 4,677,784 | 7/1987 | Butkus | 43/16 |

Primary Examiner—Kurt Rowan
Attorney, Agent, or Firm—Frank J. Dykas; Craig M. Korfanta

[57] ABSTRACT

An improved fishing pole holder (10) for holding a fishing pole while fishing, includes buzzer (28) which is responsive to a tug on fishing line (3) by a fish. Fishing pole holder (10) is constructed from an elongated hollow member (11), a pivot block (17), an elongated ground prod (14), and a sound vibration barrier (31). Pivot block (17) is pivotally attached within elongated hollow member (11) and contains buzzer (28), normally closed momentary push-button switch (29), battery (30), and biasing bolt (25). Pivot block (17) is also provided with a ground prod receiving hole (19) for removably receiving a first end (15) of elongated ground prod (14).

5 Claims, 4 Drawing Sheets

FISHING POLE HOLDER AND FISH-ON INDICATOR

BACKGROUND OF THE INVENTION

1. Technical Field

This invention generally relates to fishing pole holders and in particular, it relates to fishing pole holders having audio and/or visual signal indicating means for indicating the taking of bait by a fish.

2. Background Art

When fishing from the bank of a river or shoreline of a large body of water, it is very convenient to be able to place one's fishing pole in a fishing pole holder once the bait has been cast out into the water. The fisherman must remain close by to keep a constant watch on the fishing pole to detect a fish nibbling at the fisherman's bait. Oftentimes, it is necessary for the fisherman to leave the close proximity of the fishing pole and fishing pole holder to tend to other matters. When this happens, the fisherman is forced to reel his line in before doing so. The reason for this is that a fish could take the bait from the hook undetected by the fisherman. When the fisherman returns, he or she would then unknowingly be fishing with an unbaited hook.

Additionally, there are certain species of fish which feed at night and consequently require the fisherman to fish in the dark. Obviously, this can make it very difficult to detect the nibble or strike by a fish when using a fishing pole holder and not holding the fishing pole in one's hands.

A partial solution to these problems is offered by Bryant, U.S. Pat. No. 4,092,795. Bryant teaches a fishing pole holder which is pivotal about an earth prod and includes an electronic indicator which produces sound responsive to a tug on the line by a fish. The electronics are externally mounted and therefore subjected to inclement weather conditions which can render them inoperative.

What is needed is a fishing pole holder, including an audio and/or visual signal indicating means responsive to a tug on the fishing line by a fish, which has its electronics internally mounted so they are not subjected to adverse conditions.

The present inventors also theorize that using a device such as the one taught by Bryant, the sound vibrations generated by the signal means are transmitted through the fishing rod and fishing line directly to the water. Fish, being very vibration sensitive, are then alerted to the presence of a foreign entity and scared away.

Therefore, what is also needed is a fishing pole holder which includes a sonic or audio indicator responsive to a tug on the fishing line by a fish which does not transmit the sound vibrations of the sonic indicator to the water.

Accordingly, it is an object of the present invention to provide a fishing pole holder which includes a sonic and/or visual indicator being responsive to the taking of bait by a fish, which also does not allow sound vibrations to be transmitted through the fishing pole and fishing line to the water.

DISCLOSURE OF INVENTION

This and other objects are accomplished by an improved fishing pole holder having an elongated hollow member being pivotally attached about a ground prod, indicator means for indicating a radial displacement of the hollow member about a pivotal attachment between the hollow member and the ground prod, and a sonic barrier between the fishing pole and the fishing pole holder.

One embodiment of the present invention has a cylindrical polyvinylchloride (PVC) segment having an opening in a first end for receiving a fishing pole and an opening in a second end for receiving a pivot block and ground prod. The pivot block is pivotally attached within the elongated hollow member approximately equidistant from both ends, using a binding bolt as the pivot pin. The pivot block is radially biased about the pivot pin using a biasing bolt, biasing spring and a wing nut. A momentary normally closed push-button switch, a buzzer and a transistor battery are carried by the pivot block and are configured to produce a sonic signal responsive to a radial displacement of the pivot block about the pivot pin.

The ground prod is removably attached within the pivot block and disposed essentially collinear with the longitudinal axis of the elongated hollow member. The ground prod is also provided with a pointed end to facilitate its insertion into a river bank or shoreline. A sonic barrier means is provided within the first end of the hollow member and is disposed to isolate the fishing pole from sonic vibrations. In this particular embodiment the sonic barrier consists of a cylindrical foam cushion member having a toroidal cross section.

In lieu of or in addition to the sonic indicator, a silent indicator, such an incandescent lamp, may be added to visually indicate a fish strike. In this alternative embodiment, the hollow member is constructed from a translucent or semi-translucent material. The indicator lamp is disposed internal of the hollow member and consequently will cause the entire hollow member to "light-up" when the lamp is activated. A three position indicator switch can also be added to select either or both indicators as desired.

BEST MODE FOR CARRYING OUT INVENTION

Figure 1:
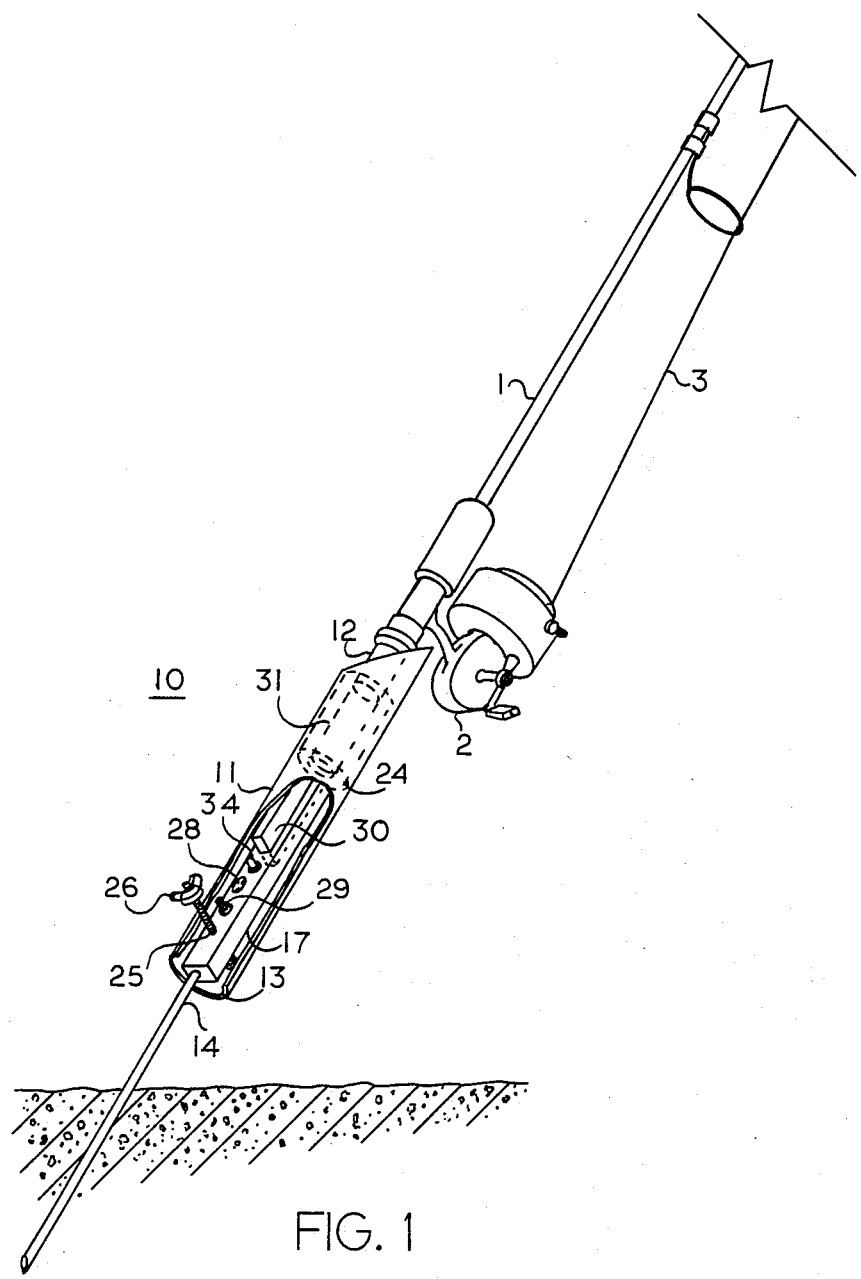
FIG. 1 is a three-quarter elevation view of a fishing pole being held in the earth by a fishing pole holder.

One embodiment of an improved fishing pole holder 10 is graphically represented in FIGS. 1-4. In general terms, fishing pole holder 10 has an elongated hollow member 11 being pivotally attached to a holding means, which in this case is ground prod 14. A sonic indicator, responsive to a tug on fishing line 3, is cooperatively attached between elongated member 11 and ground prod 14 and is totally enclosed within elongated hollow member 11 to protect the sonic indicator from the elements. A sonic barrier 31 is provided between fishing rod 1 and elogated hollow member 11 to sonically and vibrationally isolate fishing rod 1 from fishing rod holder 10. This particular feature inhibits the transmission of sound waves by fishing rod 1 and fishing line 3.

In specific terms, fishing pole holder 10 is constructed in the following manner. First, elongated hollow member 11, which is here a segment of PVC pipe, is provided with a first beveled end 12 and a second square end 13. A biasing bolt slot 32 is cut or otherwise installed in second end 13 and is disposed parallel the longitudinal axis of elongated hollow member 11. The rectangular pivot block 17 is pivotally attached about a transverse axis within elongated hollow member 11. The transverse axis lies intermediate of and perpendicular to the longitudinal axis. The pivotal attachment is accomplished by a pivot pin 24, which here consists of a binding bolt or screw. Pivot pin 24 is inserted through one pivot hole 33 in elongated hollow member 11, then through pivot bolt hole 18 in pivot block 17 and finally through the other pivot bolt hole 33 in elongated hollow member 11.

Figure 2:
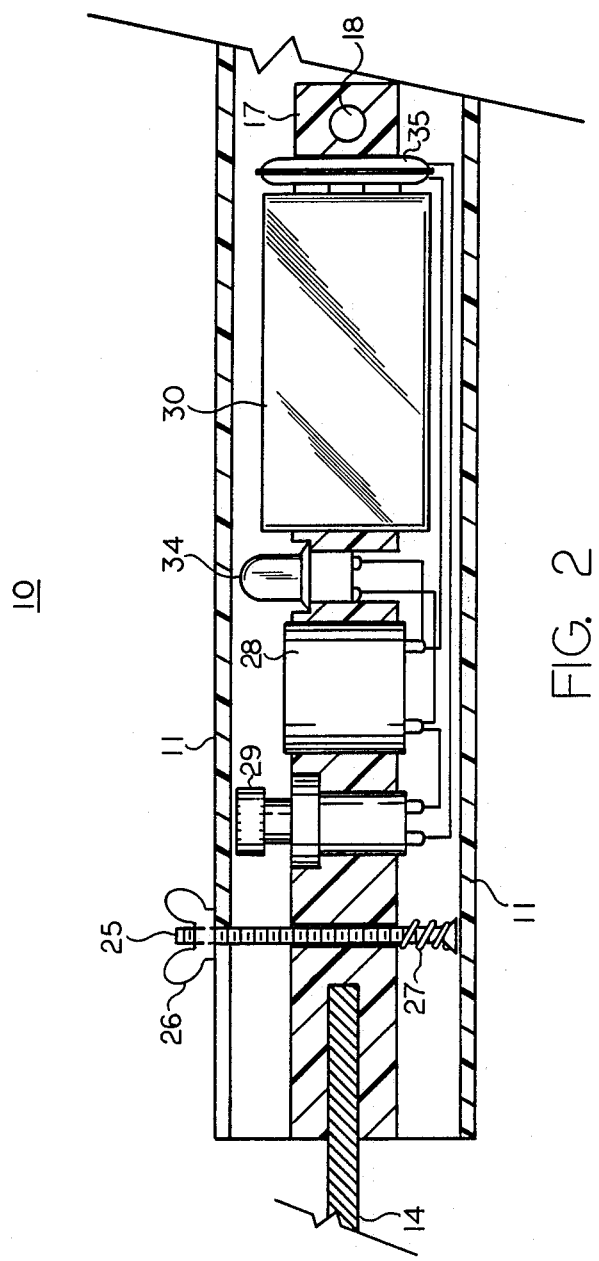
FIG. 2 is a side cross section of the pivot block assembly, elongated member and the ground prod.
Figure 3:
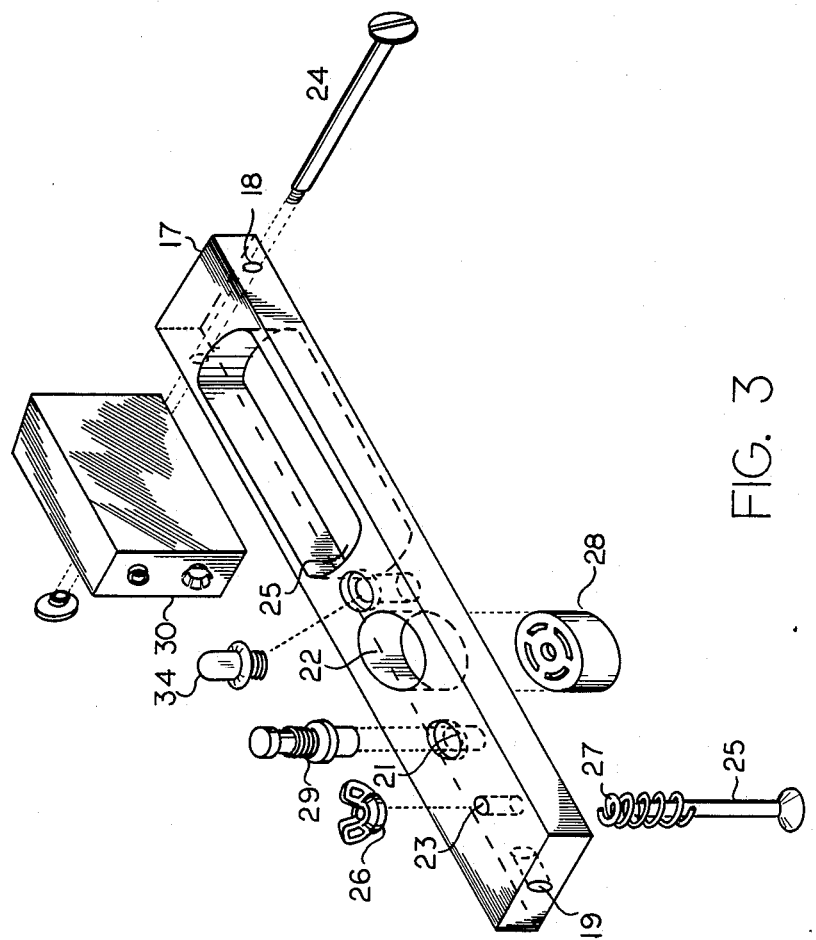
FIG. 3 is a three-quarter elevation assembly drawing of the pivot block assembly.

As can be seen from FIG. 2, a visual indicator, such as indicator lamp 34 can be added, or substituted for as buzzer 28. In this particular embodiment, indicator lamp 34 is wired in parallel with buzzer 28 and will light when buzzer 28 sounds. Here, hollow member 11 is constructed from a translucent or semi-translucent material which cause hollow member 11 to "light-up" when indicator lamp 34 is activated. It should be noted that a selector switch could also be added to select between indicators, if desired.

Pivot block 17 is provided with a plurality of holes for receiving the various elements which make up the pivot block assembly. This is shown in detail in FIG. 3. In this particular embodiment, pivot block 17 is manufactured from a non-conducting polyethylene plastic. Pivot block 17, as was previously discussed, has a pivot bolt hole 18 disposed parallel to a first end. A ground prod receiving hole 19 is provided in a second end for removably receiving the ground prod. A battery receiving hole 25, switch receiving hole 21, buzzer receiving hole 22 and a biasing bolt receiving hole 23 are all provided in the main surface of pivot block 17, each being configured to receive its respective element, battery 30 and battery connector 35, normally closed momentary push-button switch 29, buzzer 28, and biasing bolt 25. Biasing bolt 25 cooperates with bias spring 27, bias adjusting nut 26, and biasing bolt slot 32 to radially bias pivot block 17 about the transverse axis. In this manner, the sensitivity of fishing pole holder 10 can be adjusted.

Figure 4:
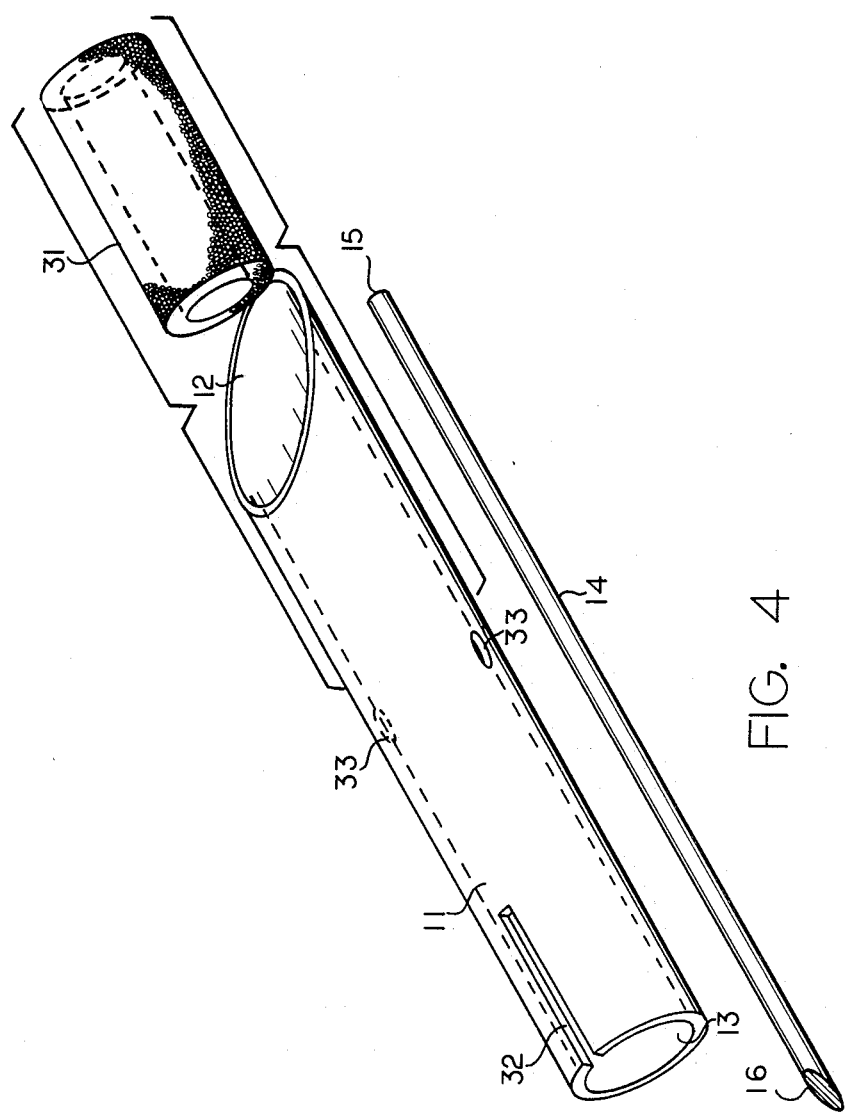
FIG. 4 is a three-quarter elevation drawings of the elongated member, sonic barrier and ground prod.

As can be seen from FIG. 4, ground prod 14 is provided with a pointed second end 16 to facilitate insertion of ground prod 14 into the river bank or shoreline. First end 15 of ground prod 14 is sized for removable engagement with ground prod receiving hole 19 in pivot block 17. Also from FIG. 4, it can be seen that a sound vibration barrier 31 is provided within first end 12 of elongated hollow member 11. In this particular embodiment, sound vibration barrier 31 consists of a cylindrical member manufactured from a compressible foam material. Sound vibration barrier 31 here has a toroidal cross section in which the inner recess is sized to closely and frictionally engage the handle of fishing rod 1. It should be apparent that sound vibration barrier 31 could also be foam strips provided around the opening in first end 12 of elongated member 11 or any other suitable arrangement which vibrationally and sonically isolates fishing rod 1 from fishing pole holder 10.

In use, a fisherman first assembles fishing pole holder 10 by inserting first end 15 of elongated ground prod 14 in ground prod receiving hole 19. Ground prod 14 is then inserted into the river bank or shoreline next to the body of water. The sensitivity of the unit is then adjusted by inserting a fishing rod into a first end 12 and mimicking the tugging action of a fish. By turning bias adjusting nut 26 either clockwise or counterclockwise the sensitivity can be decreased or increased. Once the sensitivity is set according to the fisherman's taste, a fisherman then removes the rod from the holder and casts out his line. Once the line has been cast out, the fisherman then reinserts the handle of rod 1 into first end 12 of elongated hollow member 11. Normally, the fisherman inserts the rod handle to a point where the support of reel 2 does not quite touch the pointed most end of elongated member 11.

While there is shown and described the present preferred embodiment of the invention, it is to be distinctly understood that this invention is not limited thereto but may be variously embodied to practice within the scope of the following claims.

We claim:

1. A fishing pole holder for holding a fishing pole while fishing which comprises:
an elongated hollow member having an opening in a first end for removably receiving a fishing pole, said hollow member having a central longitudinal axis defined by its length and a transverse axis disposed perpendicular to the longitudinal axis and intermediate thereof, said hollow member being constructed from at least a semi-translucent material such that said hollow member will be luminous when an indicator lamp is activated;
a pivot block being pivotally attached within said hollow member and disposed to pivot about the transverse axis, said pivot block having a ground prod receiving hole for removably receiving a ground prod through a second end of said hollow member;
an elongated ground prod having a first end being removably engaged with said ground prod receiving hole and a second pointed end to facilitate insertion of the ground prod into the ground;
biasing means being cooperatively attached between said pivot block and said hollow member for radially biasing said hollow member about the transverse axis; and
an indicator lamp being disposed within said hollow member and being responsive to a radial displacement of said hollow member about the transverse axis for indicating the taking of bait by a fish.

2. In a fishing pole holder for holding a fishing pole while fishing, said fishing pole holder having a sonic indicator for indicating the taking of bait by a fish in a body of water, an improved fishing pole holder which comprises:
an elongated hollow member having an opening in a first end for removably receiving a fishing pole, said hollow member having a central longitudinal axis defined by its length and a transverse axis disposed perpendicular to the longitudinal axis and intermediate thereof;
a pivot block being pivotally attached within said hollow member and disposed to pivot about the transverse axis;
holding means for holding said pivot block in a predetermined position in space with respect to said hollow member;
biasing means being cooperatively attached between said pivot block and said hollow member for radially biasing said hollow member about the transverse axis;
sonic indicator means being disposed within said hollow member and being responsive to a radial displacement of said hollow member about the transverse axis for indicating the taking of bait for a fish; and sonic barrier means being attached within said hollow member and disposed between the fishing pole and the fishing pole holder to isolate the fishing pole from any sonic vibrations from sonic indicator.

3. The improved fishing pole holder of claim 1 further comprising silent indicator means being attached within said hollow member and responsive to a radial displacement of said hollow member about the transverse axis for silently indicating the taking of bait by a fish.

4. The improved fishing pole holder of claim 3 wherein said holding means comprises:

said pivot block having a ground prod receiving hole for removably receiving a ground prod through a second end of said hollow member; and an elongated ground prod having a first end being removably engaged with said ground prod receiving hole and a second pointed end to facilitate insertion of the ground prod into the ground.

5. The improved fishing pole holder of claim 2 wherein said holding means comprises:

said pivot block having a ground prod receiving hole for removably receiving a ground prod through a second end of said hollow member; and an elongated ground prod having a first end being removably engaged with said ground prod receiving hole and a second pointed end to facilitate insertion of the ground prod into the ground.

* * * * *